United States Patent
Lee et al.

(10) Patent No.: US 9,729,855 B2
(45) Date of Patent: Aug. 8, 2017

(54) 3 DIMENSIONAL CAMERA AND METHOD FOR CONTROLLING THE SAME

(71) Applicant: LG ELECTRONICS INC., Seoul (KR)

(72) Inventors: Changhwan Lee, Seoul (KR); Seongkeun Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 14/540,843

(22) Filed: Nov. 13, 2014

(65) Prior Publication Data

US 2015/0156477 A1 Jun. 4, 2015
US 2017/0013250 A9 Jan. 12, 2017

Related U.S. Application Data

(60) Provisional application No. 61/903,766, filed on Nov. 13, 2013, provisional application No. 61/903,855, filed on Nov. 13, 2013.

(30) Foreign Application Priority Data

Nov. 7, 2014 (KR) ......................... 10-2014-0154799

(51) Int. Cl.
H04N 13/02 (2006.01)
H04N 5/33 (2006.01)
G03B 35/08 (2006.01)

(52) U.S. Cl.
CPC ......... *H04N 13/0207* (2013.01); *G03B 35/08* (2013.01); *H04N 5/33* (2013.01); *H04N 5/332* (2013.01); *H04N 13/025* (2013.01); *H04N 13/0253* (2013.01); *H04N 13/0257* (2013.01)

(58) Field of Classification Search
None
See application file for complete search history.

(56) References Cited

U.S. PATENT DOCUMENTS

| | | |
|---|---|---|
| 2005/0285966 A1 | 12/2005 | Bamji et al. |
| 2006/0066564 A1* | 3/2006 | Yee ........................ G06F 3/0488 345/156 |
| 2007/0182506 A1* | 8/2007 | Iikura .................... H03H 11/36 333/100 |
| 2008/0285056 A1* | 11/2008 | Blayvas ............. G01B 11/2509 356/603 |

(Continued)

FOREIGN PATENT DOCUMENTS

| | | |
|---|---|---|
| JP | 2003-121126 | 4/2003 |
| JP | 2003-169260 | 6/2003 |

(Continued)

OTHER PUBLICATIONS

PCT International Application No. PCT/KR2014/010849, Written Opinion of the International Searching Authority dated Mar. 4, 2015, 3 pages.

*Primary Examiner* — Reza Aghevli
(74) *Attorney, Agent, or Firm* — Lee, Hong, Degerman, Kang & Waimey PC

(57) ABSTRACT

A three-dimensional (3D) camera and a method for controlling the same are provided. In sensing RGB light and infrared (IR) light, the RGB light and the IR light are prevented from acting as optical noise to each other.

14 Claims, 22 Drawing Sheets

(56) References Cited

U.S. PATENT DOCUMENTS

| | | | | |
|---|---|---|---|---|
| 2011/0285910 A1* | 11/2011 | Bamji | .................. | G01S 17/89 348/631 |
| 2012/0018989 A1* | 1/2012 | Breed | .............. | B60R 21/01516 280/735 |
| 2012/0105594 A1* | 5/2012 | You | ..................... | G01S 7/4811 348/49 |
| 2013/0229499 A1* | 9/2013 | Zhao | ..................... | G06F 3/0482 348/51 |
| 2014/0111620 A1* | 4/2014 | Park | ................. | H04N 13/0239 348/46 |
| 2014/0225985 A1* | 8/2014 | Klusza | .............. | H04N 13/0207 348/43 |
| 2014/0267627 A1* | 9/2014 | Freeman | ............. | G01S 17/023 348/47 |
| 2014/0361175 A1* | 12/2014 | Lim | ...................... | G01S 7/484 250/341.8 |

FOREIGN PATENT DOCUMENTS

| | | |
|---|---|---|
| JP | 2011-199570 | 10/2011 |
| KR | 10-2010-0057983 | 6/2010 |

\* cited by examiner

3 DIMENSIONAL CAMERA AND METHOD FOR CONTROLLING THE SAME

CROSS-REFERENCE TO RELATED APPLICATIONS

Pursuant to 35 U.S.C. §119, this application claims the benefit of earlier filing date and right of priority to Korean Application No. 10-2014-0154799, filed on Nov. 7, 2014, and also claims the benefit of U.S. Provisional Application Ser. Nos. 61/903,855 filed on Nov. 13, 2013, and 61/903,766 filed on Nov. 13, 2013, the contents of which are all incorporated by reference herein in their entireties.

TECHNICAL FIELD

The present invention relates to a three-dimensional (3D) camera, and more particularly, to a 3D camera capable of generating a 3D image using IR light and RGB light and a method for controlling the same.

DISCUSSION OF THE RELATED ART

A related art camera obtains an image using a 2D image sensor, so it cannot obtain information regarding a depth (or distance) to an object, as 3D information. Recently, however, various techniques to obtain information regarding a distance to an object ahead have been developed and used. Schemes of obtaining distance information regarding an object ahead include a structured-light scheme, a time-of-flight (TOF) scheme, an RGBIR scheme, a stereoscopic camera scheme, and the like.

The structured-light scheme refers to a scheme of irradiating laser light coated with a particular pattern to an object, obtaining reflected light which is returned, calculating a shift amount of the pattern, and obtaining distance information regarding the object ahead based on the calculated shift amount.

The TOF scheme refers to a scheme of irradiating light and calculating a distance to an object based on a period of time during which reflected light regarding the irradiated light is received.

The RGBIR scheme refers to a scheme of obtaining a 2D image and information regarding a distance to an object together by using a single camera including an RGB sensor for obtaining RGB color information and an IR sensor for measuring distance information.

Among the schemes for obtaining distance information, the RGBIR scheme is advantageous in that a 2D image and information regarding a distance to an object are obtained together, but has a problem in that RGB light acts as optical noise to IR pixels of a sensor and IR light acts as optical noise to RGB pixels, degrading performance.

SUMMARY

Accordingly, an object of the present invention is to address the above-noted and other problems.

Another object of the present invention is to provide a three-dimensional (3D) camera capable of separately sensing RGB light and IR light collected by a lens to prevent RGB light and IR light from acting as optical noise to each other, and a method for controlling the same.

Another object of the present invention is to provide a 3D camera capable of rapidly restoring a sensed image with compressed information in case of obtaining an image through a compressive sensing method, and a method for controlling the same.

The object of the present invention is not limited to the aforesaid, but other objects not described herein will be clearly understood by those skilled in the art from descriptions below.

According to an aspect of the present invention, there is provided a three-dimensional (3D) camera including: a light transmitting unit configured to generate infrared (IR) light with a predetermined pattern added thereto and transmit the same; a light receiving unit configured to sense RGB light and reflected light of the transmitted IR light; and a control unit configured to control the light transmitting unit and the light receiving unit, and generate a 3D image by using the sensed RGB light and the reflected light of the sensed IR light.

The light receiving unit may include: a lens configured to collect the RGB light and the reflected light of the IR light; a reflective mirror configured to reflect light collected by the lens to a first path and a second path; an RGB sensor configured to sense the RGB light from light reflected to the first path; and an IR sensor configured to sense the reflected light of the IR light from light reflected to the second path.

The reflective mirror may be an active mirror configured to adjust a reflection path of incident light under the control of the control unit.

The light receiving unit may further include a first lens configured to collect light reflected to the first path; and an IR cut filter configured to cut reflected light of the IR light from light collected by the first lens, on the first path, and may further include a second lens configured to collect light reflected to the second path; and an IR band pass filter configured to allow the reflected light of the IR light in the light collected by the first lens therethrough, on second first path.

The first path and the second path may be symmetrical based on the reflective mirror, and the RGB sensor may be positioned on the first path, and the IR sensor may be positioned on the second path.

The light receiving unit may further include: an X-prism positioned between the lens and the reflective mirror, and the first path and the second path may be formed to be parallel with a reflective surface of the reflective mirror by passing through the X-prism.

The reflective mirror may rotate based on a rotational center, and the control unit may control rotation of the reflective mirror based on the rotational center such that the first path and the second path are formed.

The RGB sensor and the IR sensor each may be configured as a single sensor, the RGB sensor may sense compressed information regarding the RGB light from light reflected to the first path, IR sensor may sense compressed information regarding the reflected light of the IR light from light reflected to the second path, and the control unit may restore the sensed compressed information regarding the RGB light and the sensed compressed information regarding the reflected light of the IR light to generate a 3D image.

The RGB sensor may include a single R light sensor configured to sense R light, a single G light sensor configured to sense G light, and a single B light sensor configured to sense B light, the IR sensor may be configured as a single sensor, the R light sensor, the G light sensor, and the B light sensor may sense compressed information regarding the R light, the G light, and the B light reflected to the first path, respectively, the IR sensor may sense compressed information regarding the reflected light of the IR light from light reflected to the second path, and the control unit may restore the sensed compressed information regarding the R light, G light, and B light and the sensed compressed information regarding the reflected light of the IR light to generate a 3D image.

The first path and the second path may be formed as the same third path, and the light receiving unit may further include: a third lens configured to collect light reflected to the third path; an IR cut light configured to cut reflected light of the IR light from light collected by the third lens; and an IR band pass filter allowing only the reflected light of the IR light in the light collected by the third lens to pass therethrough, on the third path.

The third lens may include a lens configured to collect light reflected to the third path such that the reflected light passes through the IR cut filter and a second configured to collect light reflected to the third path such that the reflected light passes through the IR band pass filter.

The RGB sensor may include a single R light sensor configured to sense R light, a single G light sensor configured to sense G light, and a single B light sensor configured to sense B light. The third lens may include three separate lenses configured to collect light reflected to the third path such that the reflected light passes through the IR cut filter to reach the R light sensor, the G light sensor, and the B light sensor, and a lens configured to collect light reflected to the third path such that the reflected light passes through the IR band pass filter.

A surface of the third lens may be blackened to allow light reflected to the third path to pass through the IR cut filter to reach the R light sensor, the G light sensor, and the B light sensor, respectively, and light reflected to the third path to pass through the IR band pass filter.

The light receiving unit may further include barriers positioned between the R light sensor, the G light sensor, the B light sensor, and the IR sensor, respectively.

The light receiving unit may further include a plurality of micro-lenses disposed to allow light reflected to the third path, to pass therethrough after passing through the IR cut filter and the IR band pass filter.

The third lens may include a plurality of recesses formed on a surface thereof such that light collected by the third lens is sensed by the R light sensor, the G light sensor, the B light sensor, and the IR sensor, respectively.

The RGB sensors and the IR sensors may be provided and may include a smaller number of sensors than that of pixels of the reflective mirror and the number is more than 2, the RGB sensors may sense compressed information regarding the RGB light from light reflected to the first path, the IR sensors may sense compressed information regarding the reflected light of the IR light from light reflected to the second path, and the control unit may restore the sensed compressed information regarding the RGB light and the sensed compressed information regarding the reflected light of the IR light to generate a 3D image.

The RGB sensors and the IR sensors may be configured as sensors smaller than the number of pixels of the reflective mirror, the RGB sensors may sense compressed information regarding the RGB light from light reflected to the first path, the IR sensor may sense compressed information regarding the reflected light of the IR light from light reflected to the second path, and the control unit may divide the compressed information sensed by the RGB sensors and the IR sensors into four quadrants based on the center of each sensor and restore the same to generate a 3D image.

According to another aspect of the present invention, there is provided a method for controlling a three-dimensional (3D) camera, including: generating IR light with a predetermined pattern applied thereto and transmitting the same; collecting RGB light and reflected light of the transmitted IR light by using a lens; reflecting light collected by the lens to a first path and a second path by using a reflective mirror; sensing the RGB light from the light reflected to the first path by using an RGB sensor and sensing the reflected light of the IR light from the light reflected to the second path by using an IR sensor; and generating a 3D image by using the sensed RGB light and the reflected light of the sensed IR light.

The 3D camera and the method for controlling the same according to embodiments of the present invention have the following advantages.

According to at least one of embodiments of the present invention, since RGB light and IR light collected by the lens are separately sensed, RGB light and IR light can be prevented from acting as optical noise to each other.

Also, according to at least one of embodiments of the present invention, disposition efficiency of the components included in the light receiving unit can be enhanced.

Also, according to at least one of embodiments of the present invention, since various structures are adopted to receive RGB light and IR light, optical noise can be more effectively prevented.

Also, according to at least one of embodiments of the present invention, since compressed information regarding RGB light and reflected light of IR light is sensed, cost for implementing sensors can be reduced.

Also, according to at least one of embodiments of the present invention, in the case of obtaining an image through a compressive sensing method, a sensed image can be quickly restored by compressed information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a control method that may be implemented in a 3D camera according to embodiments of the present invention will be described with reference to the accompanying drawings. It will be apparent to those skilled in the art that modifications and variations can be made without departing from the spirit and scope of the invention.

Figure 1:
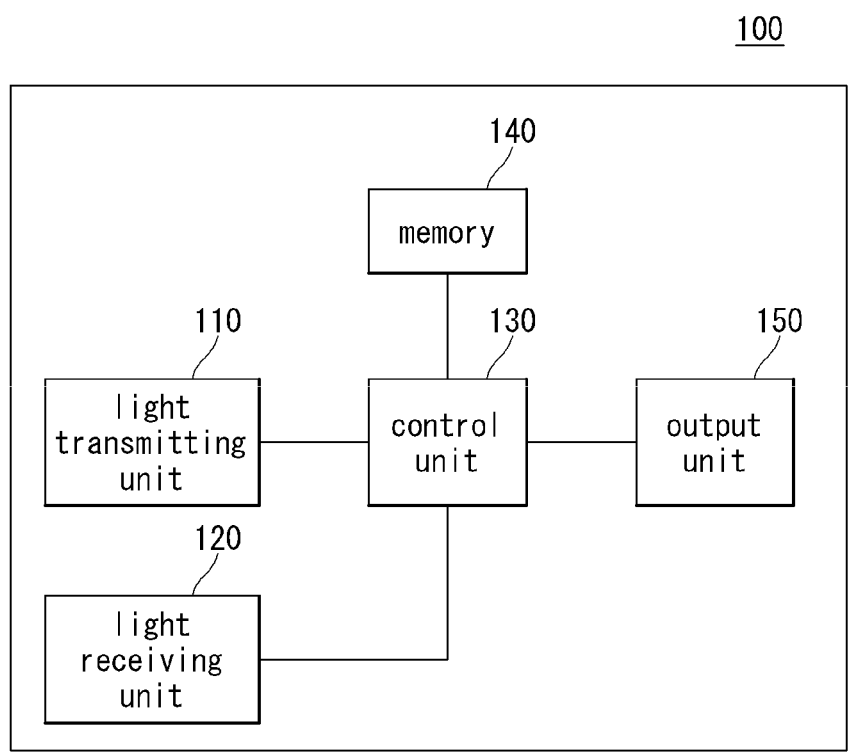
FIG. 1 is a block diagram of a 3D camera according to an embodiment of the present invention.

FIG. 1 is a block diagram of a 3D camera according to an embodiment of the present invention.

Referring to FIG. 1, a 3D camera 100 includes a light transmitting unit 110, a light receiving unit 120, a control unit 130, a memory 140, and an output unit 150. The components illustrated in FIG. 1 are not essential and the 3D camera 100 may include fewer or greater components.

Hereinafter, the components will be described.

The light transmitting unit 110 may generate and transmit light used for calculating a distance to an object ahead. Light transmitted from the light transmitting unit 110 may be IR laser light. However, the present invention is not limited thereto.

An installation position of the light transmitting unit 110 in the 3D camera 100 may be fixed or varied. Here, the light transmitting unit 110 may include a position changing unit for controlling driving force to change a position of the light transmitting unit 110.

The light receiving unit 120 may receive reflected light based on IR light transmitted from the light transmitting unit 110. Also, the light receiving unit 120 may receive RGB light. An installation position of the light receiving unit 120 in the 3D camera 100 may be fixed or varied.

The control unit 130 generally controls operations of the 3D camera 100. In detail, the control unit 130 controls operations of the components of the 3D camera 100 and generates a 3D image by using reflected light of RGB light and IR light sensed through the light receiving unit 120.

The memory 140 may store various software for driving the 3D camera 100 and may temporarily or permanently store data generated during an operation of the 3D camera 100, data received from the outside, and the like.

The output unit 150 may provide visual information, acoustic information, or tactile information to a user. Here, the information may be information regarding a simple operational state of the 3D camera 100 or information for a guide or warning reflecting an operational state of the 3D camera 100. Meanwhile, the output unit 150 may include a display unit for providing visual information, an audio output unit for providing hearing information, and the like.

Figure 2:
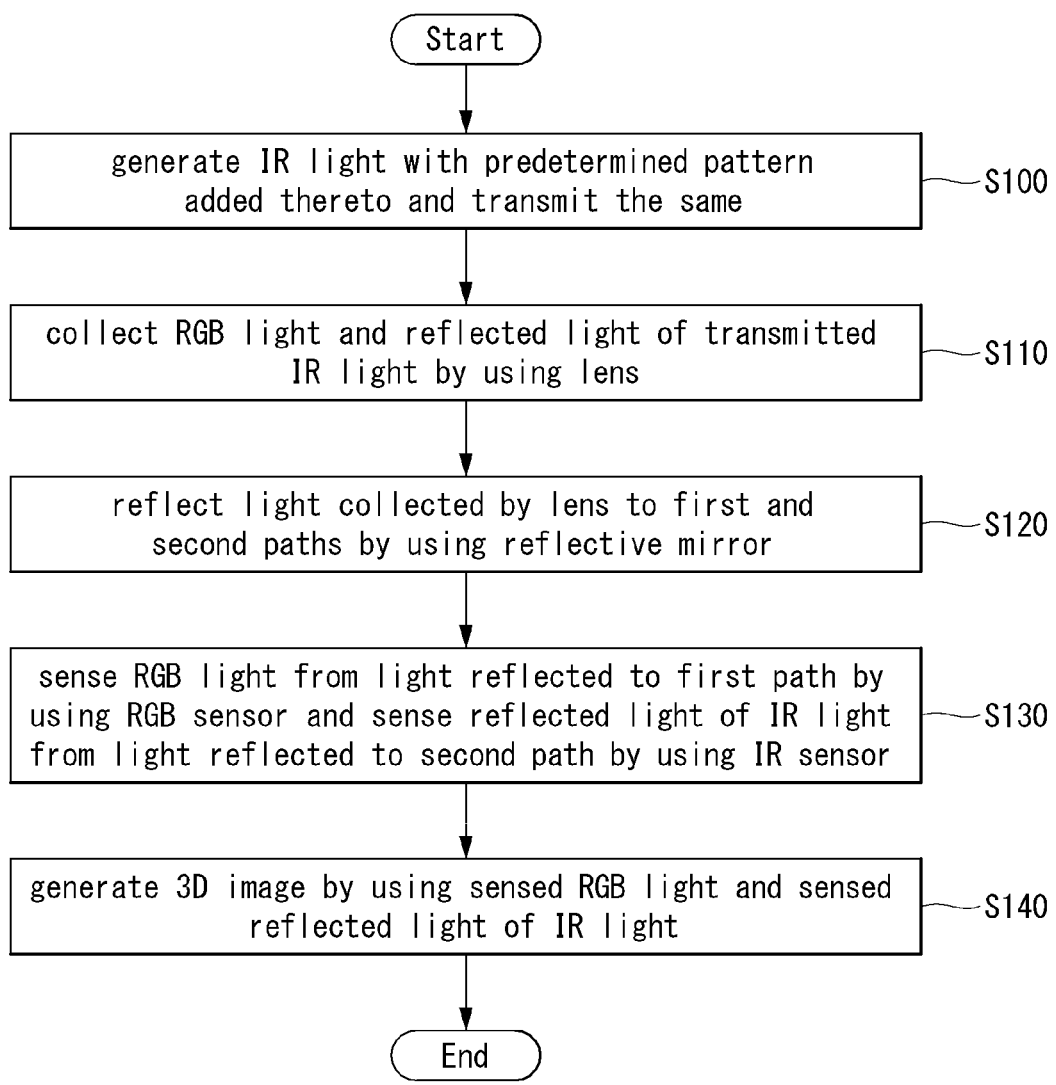
FIG. 2 is a flow chart illustrating a method for controlling a 3D camera according to an embodiment of the present invention.
Figure 3:
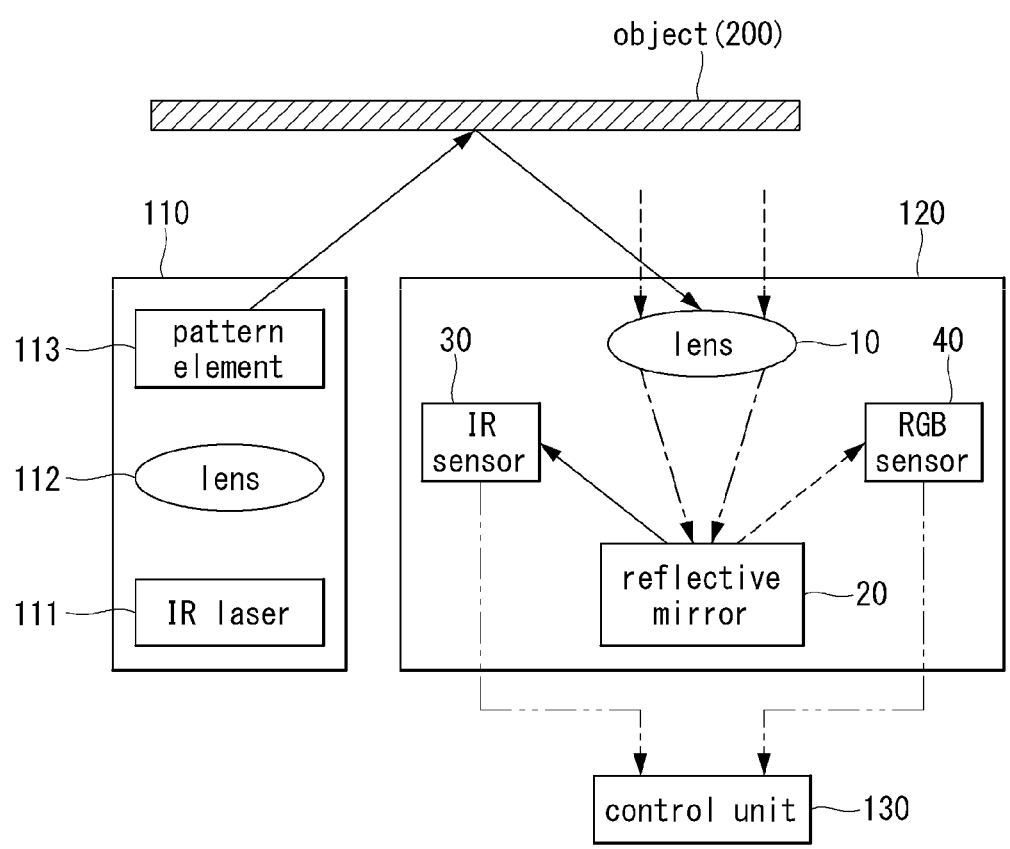
FIG. 3 is a block diagram of a 3D camera illustrating obtaining of an image according to an embodiment of the present invention.

FIG. 2 is a flow chart illustrating a method for controlling a 3D camera according to an embodiment of the present invention. FIG. 3 is a block diagram of a 3D camera illustrating obtaining of an image according to an embodiment of the present invention.

A method for controlling a 3D camera according to an embodiment of the present invention may be implemented by the 3D camera 100 described above with reference to FIG. 1. Hereinafter, a method for controlling a 3D camera according to an embodiment of the present invention and an operation of the 3D camera 100 for implementing the same will be described with reference to the relevant drawings.

Referring to FIG. 2, the light transmitting unit 110 may generate IR light with a predetermined pattern added thereto and transmit the same under the control of the control unit 130 [S100].

As illustrated in FIG. 3, the light transmitting unit 110 may include an IR laser 111, a lens 112, and a pattern element 113. The IR laser 111 may correspond to a light source that emits IR light. IR light emitted from the IR laser 111 may pass through the lens 112 and the pattern element 113.

The lens 112 may focus the emitted IR light. The pattern element 113 may apply a predetermined pattern to the emitted IR light. The control unit 18 may calculate information of a distance to an object from which IR light has been reflected by using a movement value of the pattern applied to the IR light.

The light transmitting unit 110 able to transmit IR light with a predetermined pattern applied thereto follows the known art in addition to the foregoing contents, and thus, a detailed description thereof will be omitted. Also, the light transmitting unit 110 illustrated in FIG. 3 schematically illustrates the components, and the light emitting unit 110 may further include any other components.

Referring back to FIG. 2, the light receiving unit 120 may collect RGB light and reflected light of the transmitted IR light by using a lens 10 under the control of the control unit 130 [S110].

As illustrated in FIG. 3, the light receiving unit 120 may include the lens 10. IR light transmitted from the light transmitting unit 110 may be reflected from an object 200 ahead. The reflected IR right may be made incident to an interior of the light receiving unit 120 through the lens 10.

Also, RGB light (indicated by the dotted line) may be made incident to the interior of the light receiving unit 120. Here, RGB light refers to light allowing for obtaining a general 2D image, and according to an example, the RGB light may be used to mean visible light.

Referring back to FIG. 2, the control unit 130 may reflect the light collected by the lens 10 to a first path and a second path by using a reflective mirror 20 [S120]

As illustrated in FIG. 3, light (indicated by the alternate long and short dash line) collected by the lens 10 may travel to the reflective mirror 20. According to an example, the reflective mirror 20 may be implemented as an active mirror such as a digital micro-mirror device (DMD). However, the present invention is not limited thereto and various other methods including a passive mirror such as an X-prism may also be implemented as long as a path of collected light can be separated.

The reflective mirror 20 may transmit the collected light to a first path. Also, the reflective mirror 20 may transmit the collected light to a second path under the control of the control unit 130. According to an example, separation to the first path or the second path may be implemented by controlling ON/OFF of a mirror of a DMD. However, the present invention is not limited thereto and any method may be applied as long as a path of collected light can be separated.

Referring back to FIG. 2, the RGB sensor 40 may sense the RGB light from light reflected to the first path. The IR sensor 30 may sense reflected light of the IR light from light reflected to the second path [S130]

As illustrated in FIG. 3, light traveling to the first path may be sensed by the RGB sensor 40. The RGB sensor 40 may sense the RGB light (indicated by the dotted line) to obtain an image regarding the RGB light. The obtained image (indicated by the alternate long and short dash line) may be converted into digital data and transmitted to the control unit 130.

Similarly, light traveling to the second path may be sensed by the IR sensor 30. The IR sensor 30 may sense reflected light (indicated by the solid line) of IR light to obtain image regarding the reflected light of IR light. The obtained image (indicated by the alternate long and short dash line) may be converted into digital data and transmitted to the control unit 130.

In order to obtain an image without optical noise by the RGB sensor 4 and the IR sensor 30, a component such as a filter, or the like, may be further provided, and this will be described hereinafter.

Referring back to FIG. 2, the control unit may generate a 3D image by using the sensed RGB light and the sensed reflected light of IR light [S140]

The control unit 130 may calculate a distance to the object from which IR light has been reflected, from the obtained image by sensing reflected light of IR light. Accordingly, the control unit 130 may obtain 3D information regarding objects included in the image.

The control unit 130 may obtain a 2D image from the image obtained by sensing RGB light. The control unit 130 may generate a 3D image by adding 3D information to the 2D image. In this case, the control unit 130 may use a 3D image generation algorithm stored in the memory 140. However, the present invention is not limited thereto and the restoration algorithm may be received from other storage medium, an external server, and the like.

To obtain a 3D image using the image based on IR light and the image based on RGB light, a known algorithm may be applied. Thus, a detailed description thereof will be omitted. However, the present invention is not limited to the known algorithm and any algorithm may be applied as long as it can obtain a 3D image.

In this manner, by separately sensing RGB light and IR light collected by the lens, the problem in which RGB light and IR light act as optical noise to each other can be resolved.

Figure 4:
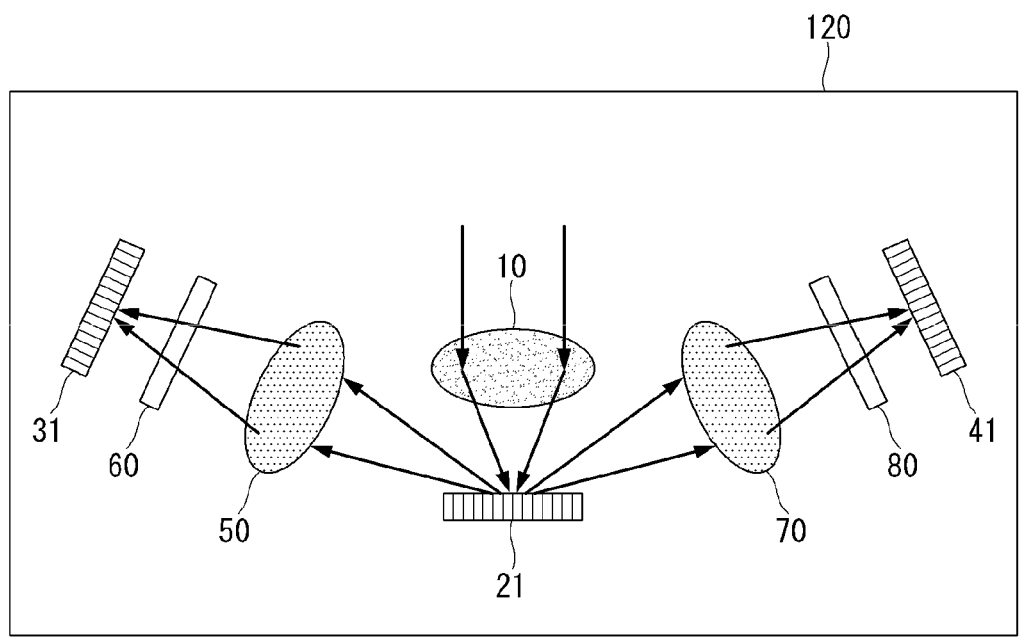
FIGS. 4, 5 and 6 are views illustrating separately sensing RGB light and IR light according to an embodiment of the present invention.
Figure 5:
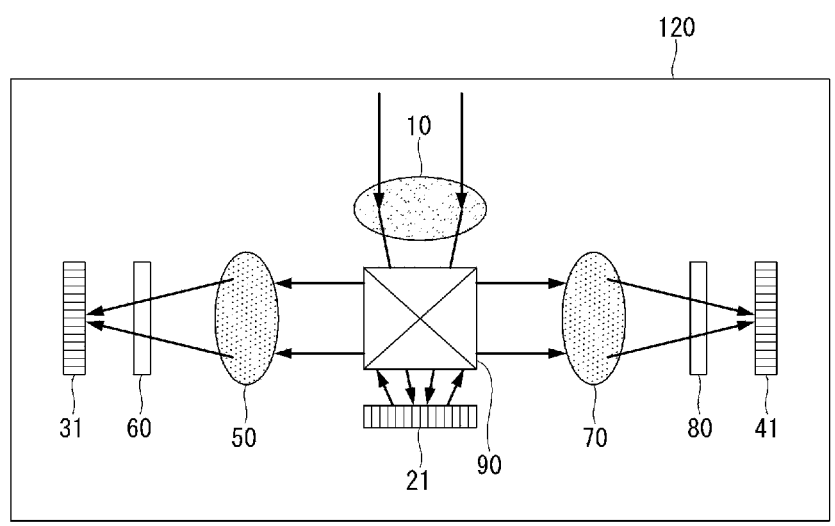
Figure 6:
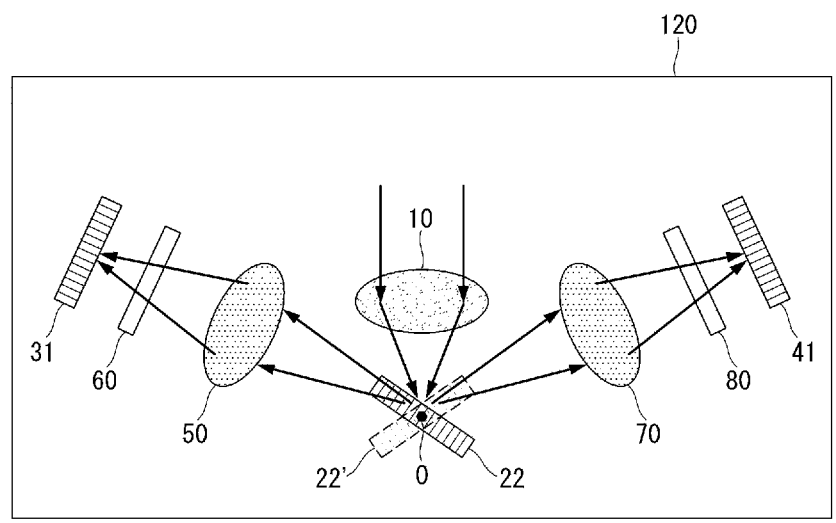

FIGS. 4 through 6 are views illustrating separately sensing RGB light and IR light according to an embodiment of the present invention.

Referring to FIG. 4, the light receiving unit 120 may include a lens 10 for collecting RGB light and reflected light of IR light. Light collected through the lens 10 from the outside may be made incident to the interior of the light receiving unit 120. The collected light may include RGB light and reflected light of IR light reflected from the object 200.

Also, the light receiving unit 120 may include a reflected mirror 21 reflecting light collected by the lens 10 to a first path and a second path. The reflective mirror 21 may be an active mirror adjusting a reflection path of incident light under the control of the control unit 130.

For example, the reflective mirror 21 may be an active mirror such as a digital micro-mirror device (DMD). The reflective mirror 21 may be formed by arranging micro-mirrors. In an example, separation of the first path and second path may be implemented by controlling ON/OFF operation of the micro-mirror of the DMD. However, the present invention is not limited thereto and any method may be applied as long as it can separate paths of collected light.

As illustrated in FIG. 4, the first path and the second path may be formed to be symmetrical based on the reflective mirror 21. However, the present invention is not limited thereto and horizontal separation of the first path and the second path based on the reflective mirror 21 may be enough and the first path and the second path may not be symmetrical.

The light receiving unit 120 may include an RGB sensor 41 for sensing RGB light from light reflected along the first path. A first lens 70 for collecting light along the first path may be positioned in the first path. The first lens 70 may collect light reflected from the reflective mirror 21, to the RGB sensor 41.

The light receiving unit 120 may further include an IR cut filter 80 in the first path. The IR cut filter 80 may cut reflected light of IR light from light collected by the first lens 70. Thus, light made incident to the RGB sensor 41 may not include IR light, and thus, IR light can be prevented from acting as optical noise when an image regarding RGB light is sensed.

The RGB sensor 41 may sense RGB light in a state in which the IR light is cut. The RGB sensor 41 may transmit an image regarding the sensed RGB light to the control unit 130. In an example, resolution of the RGB sensor 41 may be identical to that of the reflective mirror 21. Namely, each micro-mirror of the reflective mirror 21 may correspond to each pixel of the RGB sensor 41. Accordingly, the control unit 130 may rapidly obtain an image regarding the RGB light in real time.

The light receiving unit 120 may include an IR sensor 31 for sensing reflected light of IR light, from light reflected along the second path. A second lens 50 for collecting light reflected along the second path may be positioned in the second path. The second lens 50 may collect light reflected from the reflective mirror 21 by the IR sensor 31.

The light receiving unit 120 may further include an IR band pass filter 60 in the second path. The IR band pass filter 60 may allow only reflected light of IR light, in light collected by the second lens 50. Thus, light made incident to the IR sensor 31 includes only IR light, thus preventing RGB light from acting as optical noise when an image regarding IR light is sensed.

The IR sensor 31 may sense IR light in a state in which RGB light is cut. The IR sensor 31 may transmit an image regarding the sensed IR light to the control unit 130. In an example, resolution of the IR sensor 31 may be identical to that of the reflective mirror 21. Namely, each micro-mirror of the reflective mirror 221 may correspond to each pixel of the IR sensor 31. Accordingly, the control unit 130 may rapidly obtain an image regarding IR light in real time.

Thereafter, as described above, the control unit 130 may generate a 3D image by using the image regarding IR light and the image regarding RGB light.

According to the structure of FIG. 4, a size of the light receiving unit 120 may be increased in order to avoid physical interference among the lens 10, the first lens 70, and the second lens 50. Hereinafter, an embodiment in which the size of the light receiving unit 120 will be described.

Referring to FIG. 5, the light receiving unit 120 may further include an X-prism 90 positioned between the lens 10 and the reflective mirror 21. Light collected by the lens 10 and light reflected from the reflective mirror 21 may pass through the X-prism 90 and travel in parallel with a reflective surface of the reflective mirror 21.

Namely, as illustrated in FIG. 5, the first path and the second path may be formed to be parallel to the reflective surface of the reflective mirror 21 after passing through the X-prism 90. Operations of the other components of the light receiving unit 120 illustrated in FIG. 5 are the same as those described above with reference to FIG. 4, and thus, a detailed description thereof will be omitted.

As illustrated in FIG. 5, by making the first path and the second path parallel with the reflective surface of the mirror 21, the light receiving unit 120 may be reduced in thickness, compared with the light receiving unit 120 of FIG. 4. Also, since a reflecting angle is minimized, rotational distortion can be minimized.

The embodiment employing the X-prism 90 of FIG. 5 may also be applied to other embodiment substantially in the same manner.

Referring to FIG. 6, a reflective mirror 22 may rotate based on a rotational center o. The control unit 130 may control rotation of the reflective mirror 22 based on the rotational center o such that the first path and the second path can be formed.

In order to reflect light along the first path, the control unit 130 may rotate the reflective mirror 22 to the position denoted by reference numeral 22. Also, in order to reflect light along the second path, the control unit 130 may rotate a reflective mirror 22' to the position denoted by reference numeral 22'.

Accordingly, reflective paths of light may be formed at various angles without being limited to the reflective angle of the reflective mirror 22.

Operations of other components of the light receiving unit 120 illustrated in FIG. 6 are the same as those described above with reference to FIG. 4, so a detailed description thereof will be omitted.

The embodiment in which the reflective mirror 22 is rotated in FIG. 6 described above may also be applied to other embodiment substantially in the same manner. Also, for example, a case in which the RGB sensor includes an R sensor, a G sensor, and a B sensor may be considered. In this case, a total of four sensors with the IR sensor inclusive may be disposed in different directions and the reflective mirror 22 may be rotated to reflect light in paths of four directions.

Figure 7:
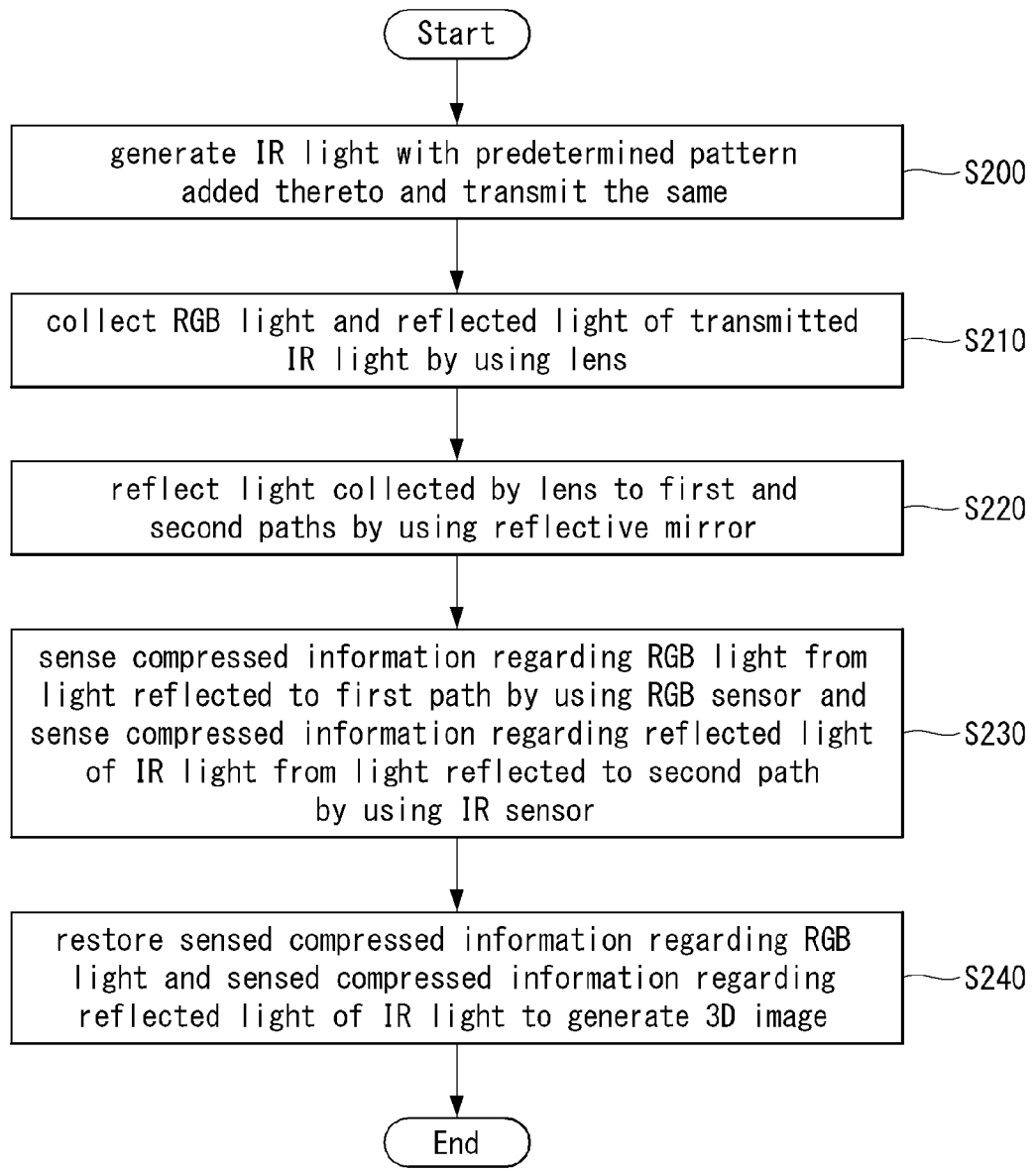
FIG. 7 is a flow chart illustrating a method of compressively sensing an image according to an embodiment of the present invention.
Figure 8:
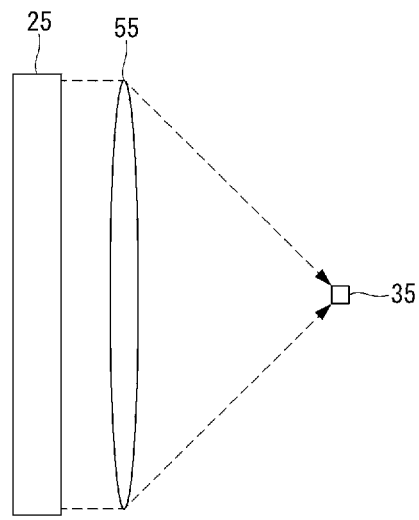
FIG. 8 is a view illustrating a method of compressively sensing an image according to an embodiment of the present invention.

FIG. 7 is a flow chart illustrating a method of compressively sensing an image according to an embodiment of the present invention. FIG. 8 is a view illustrating a method of compressively sensing an image according to an embodiment of the present invention.

Referring to FIG. 7, step S200 of generating IR light with a predetermined pattern applied thereto and transmitting by the light transmitting unit 110 may be applied in a substantially same manner as that of step S100 described above with reference to FIG. 2. Also, step S210 of collecting RGB light and reflected light of the transmitted IR light by using the lens 10 may be applied in a substantially same manner as that of step S110 described above with reference to FIG. 2. Also, step S220 of reflecting light collected by the lens 10 to the first path and the second path by using the reflective mirror 20 may be applied in a substantially same manner as that of step S120 described above with reference to FIG. 2. Thus, a detailed description thereof will be omitted.

Referring back to FIG. 7, the RGB sensor 40 may sense compressed information regarding the RGB light from light reflected to the first path. The IR sensor 30 may sense compressed information regarding reflected light of the IR light reflected to the second path [S230].

In the above description of FIG. 4, it is based upon the premise that the resolution of the reflective mirror 21 and that of the sensors 31 and 41 are identical. In this case, since the sensor is implemented as a plurality of sensors, cost for the sensors increases.

In order to reduce the cost, the sensor 35 may be implemented as a single sensor as illustrated in FIG. 8. Referring to FIG. 8, light reflected from a reflective mirror 25 may be collected by a lens 55. The collected light may be focused to the single sensor forming the sensor 35.

The reflective mirror 25 may be implemented as the DMD. A sample may be formed by applying a plurality of DMD patterns and it may be sensed by the single sensor. In this case sensed light has compressed information, rather than an actual image.

The method of using compressed information, a compressive sensing method related to image obtainment, follows a known method, and thus, a detailed description thereof will be omitted.

Referring back to FIG. 7, the control unit 130 may restore the sensed compressed information regarding the RGB light and the sensed compressed information regarding reflective light of the IR light to generate a 3D image [S240].

The control unit 130 may restore the sensed compressed information regarding the RGB light to an actual image. Also, the control unit 130 may restore the sensed compressed information regarding reflected light of the IR light into an actual image. In this case, the control unit 130 may use a restoration algorithm stored in the memory 140.

However, the present invention is not limited thereto and the restoration algorithm may be received from other storage medium, an external server, and the like.

By restoring the compressed information regarding reflected light of IR light, the control unit 130 may calculate a distance to an object from which IR light has been reflected, from the obtained image. Accordingly, the control unit 130 may obtain 3D information regarding objects included in the image.

The control unit 130 may obtain a 2D image from the image obtained by restoring the compressed information regarding the RGB light. The control unit 130 may add the 3D information to the 2D image to generate a 3D image.

In this manner, by separately sensing RGB light and IR light collected by the lens, RGB light and IR light can be prevented from acting as optical noise to each other. Also, since compressed information regarding RGB light and IR light is sensed, cost for implementing the sensor can be reduced.

Hereinafter, a specific embodiment will be described with reference to FIGS. 9 through 15. FIGS. 9 through 15 are views illustrating separately sensing RGB light and IR light in a method of compressively sensing an image according to an embodiment of the present invention.

Figure 9:
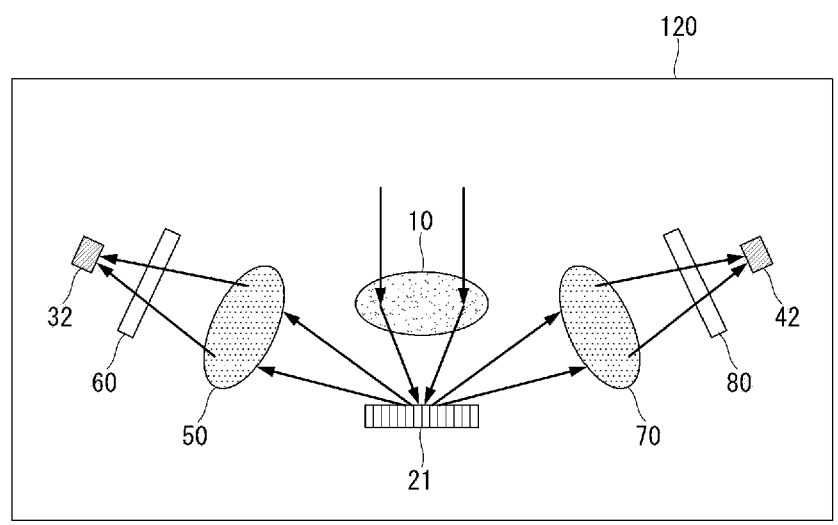
FIGS. 9, 10, 11, 12, 13, 14 and 15 are views illustrating separately sensing RGB light and IR light in a method of compressively sensing an image according to an embodiment of the present invention.

Referring to FIG. 9, the light receiving unit 120 may include an RGB sensor 42 formed as a single sensor and an IR sensor 32 formed as a single sensor. Light collected by the lens may reflect to the first path and the second path through the reflective mirror 21.

A first lens 70 and an IR cut filter 80 may be positioned in the first path. Operations of the first lens 70 and the IR cut filter 80 are substantially the same as those described with reference to FIG. 4, and thus, a detailed description thereof will be omitted.

The RGB sensor 42 formed as a single sensor may sense compressed information regarding the RGB light from light reflected to the first path. Sensing of the compressed information may follow the compressive sensing method described above with reference to FIGS. 7 and 8.

A second lens 50 and an IR band pass filter 60 may be positioned in the second path, and operations of the second lens 50 and the IR band pass filter 60 are substantially the same as those described above with reference to FIG. 4, and thus, a detailed description thereof will be omitted.

The IR sensor 32 configured as a single sensor may sense compressed information regarding reflected light of the IR light, from light reflected to the second path. Sensing of the compressed information may follow the compressive sensing method described above with reference to FIGS. 7 and 8.

The control unit 130 may restore the sensed compressed information regarding the RGB light to generate an image regarding the RGB light. Also, the control unit 130 may restore the sensed compressed information regarding reflected light of the IR light to generate an image regarding the reflected light of the IR light. The control unit 130 may generate a 3D image by using the image regarding the RGB light and the image regarding the reflected light of the IR light.

In this manner, since RGB light and IR light collected by the lens are separately sensed, RGB light and IR light can be prevented from acting as optical noise to each other. Also, since compressed information regarding the RGB light and reflected light of IR light is sensed, cost for implementing the sensor can be reduced.

Figure 10:
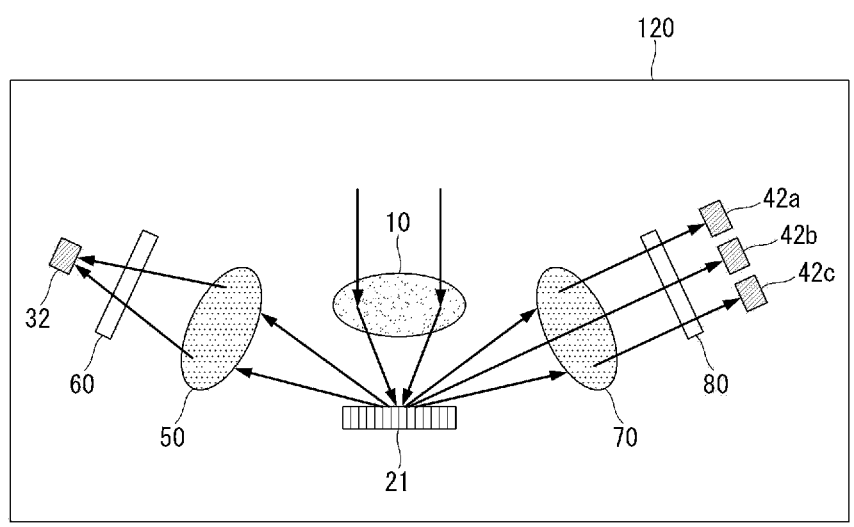

Referring to FIG. 10, the RGB sensor may include a single R light sensor 42a for sensing R light, a single G light sensor 42b for sensing G light, and a single B light sensor 42c for sensing B light. The IR sensor 32 and other components are identical to those of the embodiment of FIG. 9, so a detailed description thereof will be omitted.

The R light sensor 42a may sense compressed information regarding R light among R, G, and B light reflected from the reflective mirror 21. Similarly, the G light sensor 42b may sense compressed information regarding G light among the R, G, and B light reflected from the reflective mirror 21. Similarly, the B light sensor 42c may sense compressed information regarding B light among the R, G, and B light reflected from the reflective mirror 21.

The control unit 130 restores compressed information regarding each of the R light, G light, and B light to generate an image regarding the RGB light. In another example, the control unit 130 may generate an image of each of the R light, G light, and B light. Thereafter, the control unit 130 may generate an image regarding RGB light by using each of the images regarding the R light, G light, and B light.

The control unit 130 may restore compressed information regarding reflected light of the sensed IR light to generate an image regarding the reflected light of the IR light. The control unit 130 may generate a 3D image by using the image regarding RGB light and the image regarding reflected light of IR light.

In this manner, since RGB light and IR light collected by the lens are separately sensed, RGB light and IR light can be prevented from acting as optical noise to each other. Also, since the RGB sensor is implemented as respective sensors, RGB light can be precisely adjusted in generating a 3D image.

Figure 11:
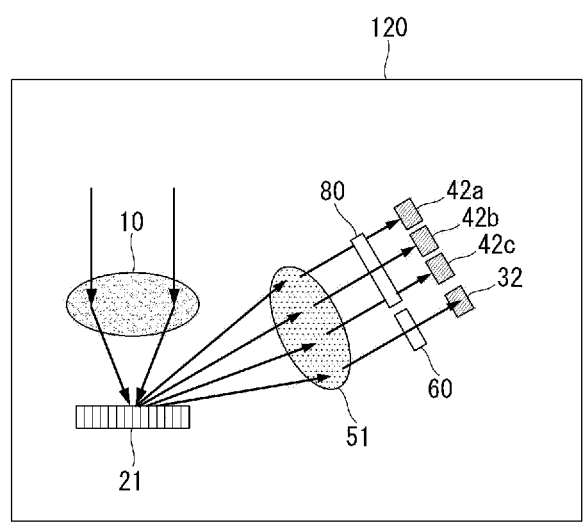

Referring to FIG. 11, the first path and the second path may be formed as the same third path. The control unit 130 may control the reflective mirror to reflect light collected by the lens 10 to the third path.

In this case, a single third lens 51 may collect light reflected from the reflective mirror 21. As illustrated in FIG. 11, the IR cut filter 80 and the IR band pass filter 60 may be positioned not to overlap each other.

The R light sensor 42a, the G light sensor 42b, and the B light sensor 42c may sense R light, G light, and B light from light which has passed through the IR cut filter 80, respectively. Also, the IR sensor 32 configured as a single sensor may sense IR light from light which has passed through the IR band pass filter 60.

In an example, since the single third lens 51 is used, the R light sensor 422a, the G light sensor 42g, the B light sensor 42c, and the IR sensor 34 may be positioned at different distance from the reflective mirror 21 according to a focusing position. In this case, the light receiving unit 120 may further include an actuator for moving the third lens 51 to adjust a focusing position.

In the case of the embodiment illustrated in FIG. 11, operations of the components are identical to those of FIG. 9 described above, except for the difference according to the third path, and thus, a detailed description thereof will be omitted.

In this manner, since RGB light and IR light collected by the lens are separately sensed, RGB light and IR light can be prevented from acting as optical noise to each other. Also, since the sensors are positioned in the single path, the size of the light receiving unit 120 can be reduced and cost for the lens can be reduced.

Figure 12:
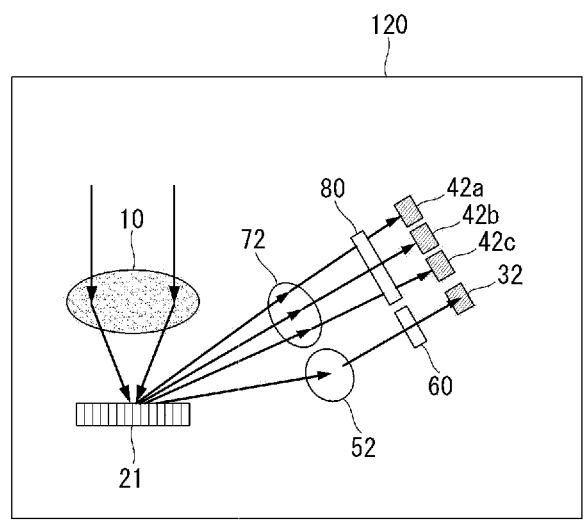

Referring to FIG. 12, the third lens may include a lens 72 collecting light reflected to the third path and allowing the collected light to pass through the IR cut filter 80 and a lens 52 collecting light reflected to the third path and allowing the collected light to pass though the IR band pass filter 60.

The lens 72 may collect light reflected from the reflective mirror 21 such that the reflected light is sensed by the R light sensor 42a, the G light sensor 42b, and the B light sensor 42c. Also, the lens 52 may collect light reflected from the reflective mirror 21 such that the reflected light is sensed by the IR sensor 32 configured as a single sensor.

In an example, the light receiving unit 120 may further include an actuator for moving positions of the lenses 52 and 72.

In the case of the embodiment illustrated in FIG. 12, operations of the components are identical to those of FIG. 11 described above, except for the difference in the third lenses 52 and 72, and thus, a detailed description thereof will be omitted.

In this manner, since RGB light and IR light collected by the lens are separately sensed, RGB light and IR light can be prevented from acting as optical noise to each other. Also, since each sensor is positioned in the single path, the size of the light receiving unit 120 can be reduced.

Figure 13:
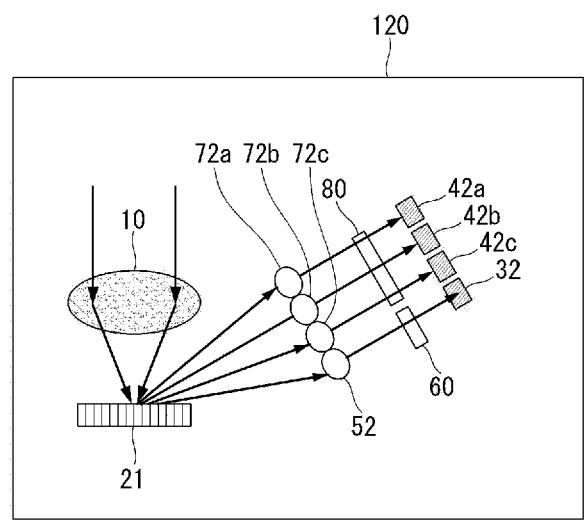

Referring to FIG. 13, the third lens may include three separated lenses 72a, 72b, and 72c collecting light reflected to the third path such that the reflected light passes through the IR cut filter 80. Light which has passed through the three separated lenses 72a, 72b, and 72c may reach the R light sensor, the G light sensor, and the B light sensor, respectively.

Also, the third lens may include a lens 52 collecting light reflected to the third path such that the reflected light passes through the IR band pass filter 600.

In an example, the light receiving unit 120 may further include an actuator for moving positions of the lenses 72, 72a, 72b, and 72c.

In the case of the embodiment illustrated in FIG. 13, operations of the components are identical to those of FIG. 11 described above, except for the difference according to the third lenses 51, 72a, 72b, and 72c, and thus, a detailed description thereof will be omitted.

In this manner, since RGB light and IR light collected by the lens are separately sensed, RGB light and IR light can be prevented from acting as optical noise to each other. Also, by matching the lenses to the sensors, respectively, a precise image can be obtained.

Figure 14:
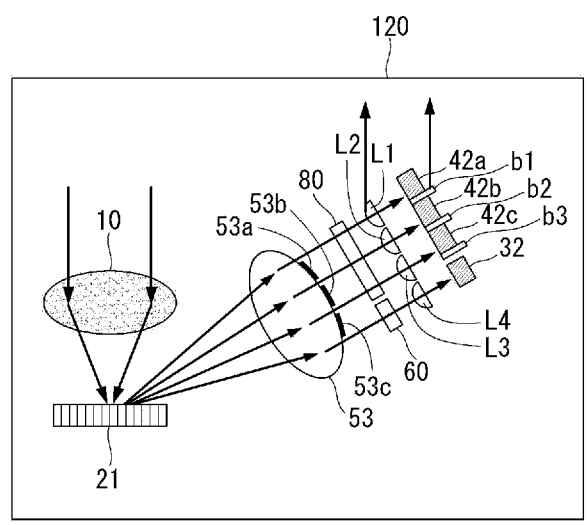

Referring to FIG. 14, surfaces 53a, 53b, and 53c of the third lens 53 may be blackened. Blackening portions of the surface of the third lens 53 refer to prevent light to pass therethrough. Here, any method may be employed as blackening as long as it can prevent light from passing through a portion of the surface of the third lens 53.

As illustrated in FIG. 14, light reflected to the third path through a portion which is not blackened may reach the R light sensor 42a, the G light sensor 42b, and the B light sensor 42c through the IR band pass filter 80. Also, light reflected to the third path through the portion which is not blackened may be sensed by the IR sensor 32 through the IR band pass filter 60.

In an example, the light receiving unit 120 may further include barriers b1, b2, and b3 positioned between the R light sensor 42a, the G light sensor 42b, and the B light sensor 42c. The barriers b1, b2, and b3 may prevent light interference between the sensors 32, 42a, 42b, and 42c.

The barriers b1, b2, and b3 are not limited to a particular material or a particular form. Forms or materials of the barriers b1, b2, and b3 may be varied as necessary as long as they can prevent light interference between the sensors 32, 42a, 42b, and 42c.

In an example, the light receiving unit 120 may further include a plurality of micro-lenses L1 to L4 disposed to allow light reflected to the third path to pass therethrough after passing through the IR cut filter 80 and the IR band pass filter 60. If needed, the plurality of micro-lenses L1 to L4 may be positioned in front of the sensors 32, 42a, 42b, and 42c, respectively.

Light reflected to the third path may be more collected while passing through the plurality of micro-lenses L1 to L4 so as to be made incident to the sensors 43, 42a, 42b, and 42c. Accordingly, interference according to an incident angle to the sensors 32, 42a, 42b, and 42c may be prevented.

In the case of the embodiment illustrated in FIG. 14, operations of the components are identical to those of FIG. 9 described above, except for the foregoing difference and thus, a detailed description thereof will be omitted.

In this manner, since RGB light and IR light collected by the lens are separately sensed, RGB light and IR light can be prevented from acting as optical noise to each other. Also, optical noise can be more reliably removed by adding the various components.

Figure 15:
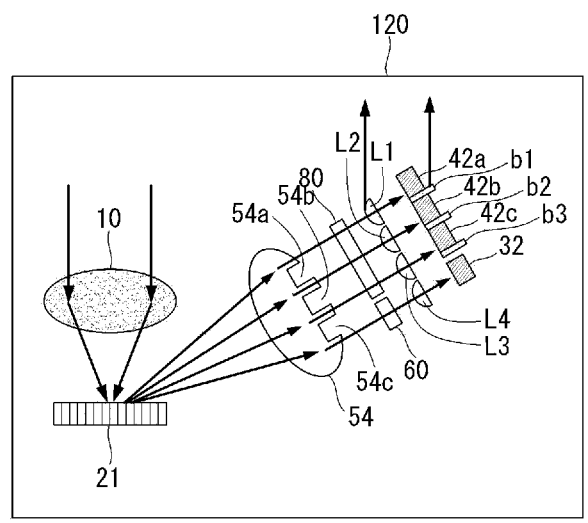

Referring to FIG. 15, the third lens 54 may have a plurality of recesses 54a, 54b, and 54c formed on a surface thereof to allow light collected by the third lens 54 to be sensed by the R light sensor 42a, the G light sensor 42b, the B light sensor 42c, and the IR sensor 32, respectively.

As illustrated in FIG. 15, light reflected to the third path through a portion without the plurality of recesses 54a, 54b, and 54c may pass through the IR cut filter 80 and reach the R light sensor 42a, the G light sensor 42b, and the B light sensor 42c. Also, light reflected to the third path through a portion without the plurality of recesses 54a, 54b, and 54c may pass through the IR band pass filter 60 so as to be sensed by the IR sensor 32.

In the case of the embodiment illustrated in FIG. 15, operations of the components are identical to those of FIG. 14 described above, except for the foregoing difference and thus, a detailed description thereof will be omitted.

In this manner, since RGB light and IR light collected by the lens are separately sensed, RGB light and IR light can be prevented from acting as optical noise to each other. Also, optical noise can be more reliably removed by adding the various components.

FIGS. 16 through 21 are views illustrating rapidly restoring compressed information in a method of compressively sensing an image according to an embodiment of the present invention.

In the case of the compressive sensing described above with reference to FIG. 8, the sensor 35 is implemented as a single sensor to obtain information compressed with high compression rate. In this case, cost for the sensor forming the sensor 35 may be lowered, but it may take a long time to restore an image from the compressed image due to the high compression rate thereof.

Figure 16:
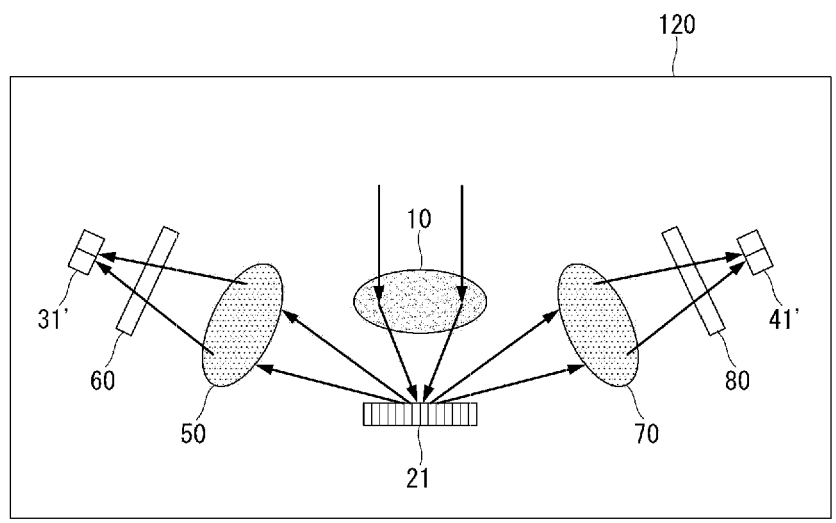
FIGS. 16, 17, 18, 19, 20 and 21 are views illustrating rapidly restoring compressed information in a method of compressively sensing an image according to an embodiment of the present invention.
Figure 17:
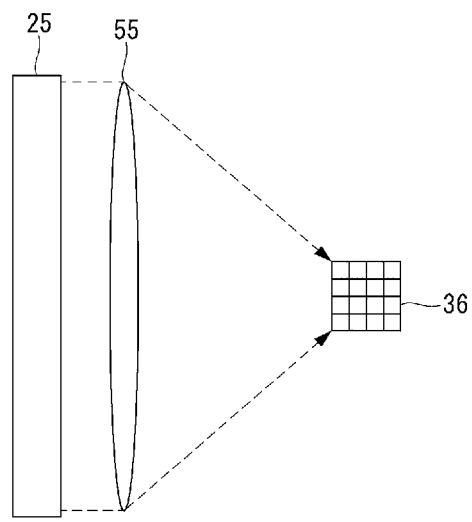
Figure 18:
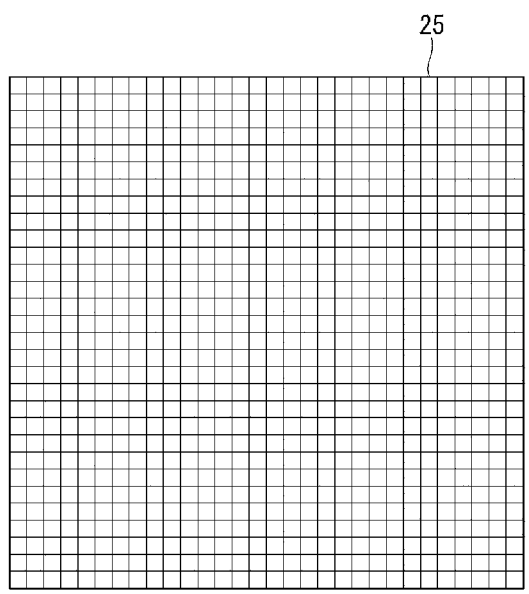

In order to reduce a time for restoring an image, as illustrated in FIG. 16, two or more RGB sensor 41' and IR sensor 31' may be provided, and a smaller number of RGB sensors and IR sensors than the number of pixels of the reflective mirror may be provided. For example, when the number of pixels of the reflective mirror is equal to that of FIG. 18, the sensor 36 may be implemented as sixteen sensors smaller than the number of the pixels of the reflective mirror as illustrated in FIG. 17.

Figure 19:
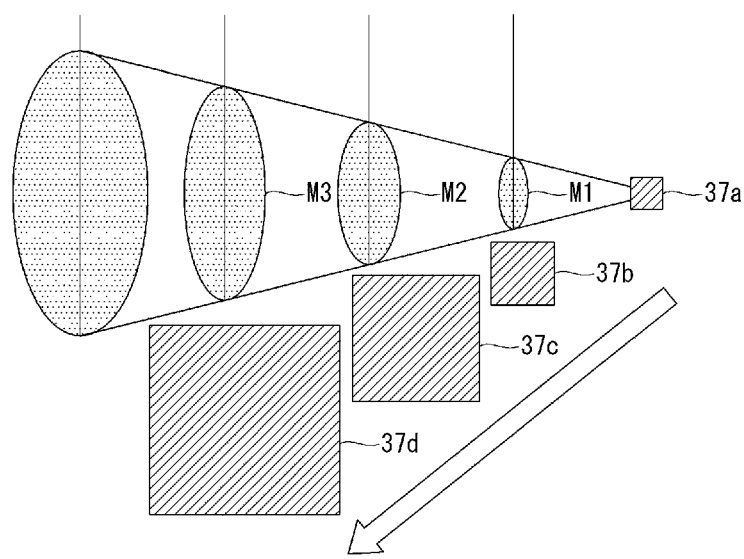

In the case in which two or more sensors 36 are provided and the sensors 36 are formed as sensors smaller than the number of pixels of the reflective mirror, compressed information having lower compression rate than that of the case in which only a single sensor is provided can be sensed by the sensor 36. Referring to FIG. 19, sensors 37a to 37d respectively corresponding to unit areas when light reflected from the reflective mirror 25 is collected by the lens 55 are illustrated.

Namely, in case of being focused to a single sensor, the sensor 37a formed as a single sensor may be applied. In this case, compression rate may be highest. Next, when focused to M1, the sensor 37b formed as a larger number of sensors than the sensor 37a may be applied. In this case, compression rate may be lowered, relative to that of the sensor 37a, and thus, restoration rate may be increased.

Similarly, when focused to M2, the sensor 37c formed as a larger number of sensors than the sensor 37b may be applied. In this case, compression rate may be lowered, relative to that of the sensor 37a, and thus, restoration rate may be increased.

Similarly, when focused to M3, the sensor 37d formed as a larger number of sensors than the sensor 37c and equal to the number of the pixels of the reflective mirror 25 may be applied. In this case, an image sensed by the sensor 37d may be an uncompressed image, and thus, an image can be obtained substantially in real time without the necessity of a restoration process.

Figure 20:
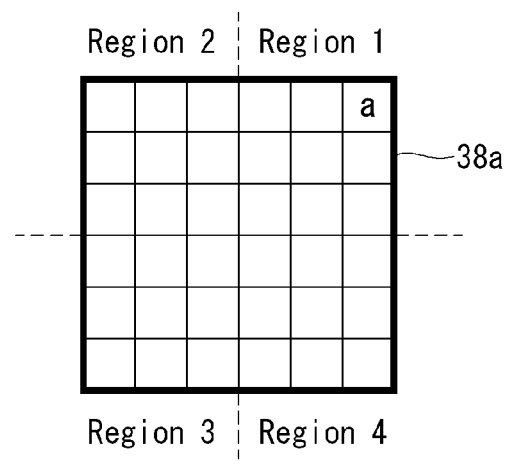
Figure 21:
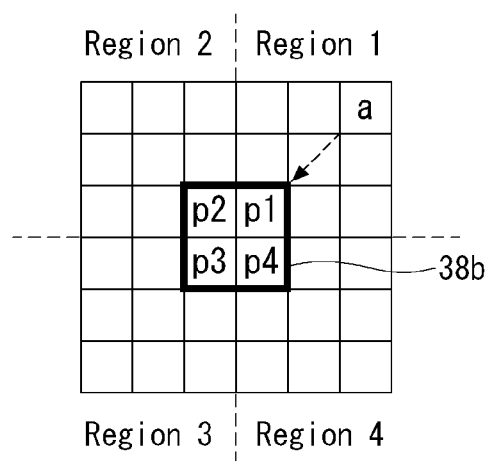

FIGS. 20 and 21 are views illustrating rapidly restoring compressed information by using regionality in optical compression. A case in which light sensed by a sensor 38a illustrated in FIG. 20 is further compressed and sensed by a sensor 38b illustrated in FIG. 21 may be considered. FIG. 21 illustrates both the sensor 38b and 38a for the convenience of comparison.

When information regarding a pixel a in region 1 which is sensed by the sensor 38a, is sensed by the sensor 38b, the information is sensed in region p1 of the sensor 38b. Namely, as illustrated in FIG. 19, when light is compressed, the center is maintained, while regions are reduced.

Thus, the information included in the region 1 sensed by the sensor 38a may be included only in the region p1 of the sensor 38b. Namely, in case of increasing compression rate, the information included in the region 1 may not affect regions p2, p3, and p4 of the sensor 38b.

Based on the rationality in optical compression, the control unit 130 may divide compressed information sensed by the RGB sensor and the IR sensor into four quadrants based on the center of each sensor and restore the same. In general, as the compression rate is increased, a time for restoring compressed information can be more quickly increased. Thus, a time for restoring the regions reduced to quarters four times may be reduced to be smaller than a time required for restoring the entire region once, and thus, the control unit 130 may more rapidly restore the compressed information.

Accordingly, the control unit 130 may more rapidly generate a 3D image.

Figure 22:
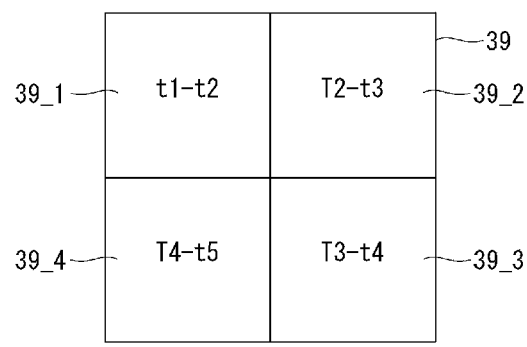
FIG. 22 is a view illustrating temporal compression according to an embodiment of the present disclosure.

FIG. 22 is a view illustrating temporal compression in the case of optical compression. A reflective mirror 39 may be divided into four quadrants 39_1 to 39_4 based on the center thereof. Thereafter, light reflected from each region may be sensed by the sensor by time.

For example, the region 39_1 may operate for a period of time from a certain time t1 to t2 to reflect light. Similarly, the other regions 39_2 to 39_4 may operate in time order (from t2 to t5). Based on this, the size of the sensor may need only to be a quarter of the reflective mirror, the number of the sensor may be reduced.

Accordingly, cost for the sensor can be reduced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the control unit 130 of the 3D camera.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A three-dimensional (3D) camera comprising:
a light transmitter configured to transmit infrared (IR) light with a predetermined pattern to at least one object;
a light receiver configured to sense incoming light comprising red-green-blue (RGB) light and the IR light reflected from the object, the light receiving unit comprising:
an outer lens configured to direct the incoming light to a reflective mirror, the reflective mirror configured to direct the incoming light to a first path and a second path, wherein the first path and the second path are both included in a third path toward an inner lens, and the incoming light is directed to pass through an IR cut-off filter on the first path and an IR band pass filter on the second path;
an RGB sensor configured to sense the RGB light of the incoming light passing through the IR cut-off filter; and
an IR sensor configured to sense the IR light reflected from the reflective mirror of the incoming light passing through the IR band pass filter; and
a controller configured to:
cause the light transmitter to transmit the IR light with the predetermined pattern;
obtain information of the sensed RGB light and IR light reflected from the reflective mirror via the light receiver; and
generate a 3D image using the obtained information,
wherein the IR cut-off filter blocks IR light of the incoming light from passing through and the IR band pass filter allows only IR light of the incoming light to pass through.

2. The 3D camera of claim 1, wherein the reflective mirror is an active mirror and the controller is further configured to adjust a position of the reflective mirror.

3. The 3D camera of claim 1, wherein:
the reflective mirror is further configured to rotate about a rotational center; and
the controller is further configured to control rotation of the reflective mirror in order to control directions of the first path and the second path.

4. The 3D camera of claim 1, wherein:
the RGB sensor and the IR sensor comprise a single sensor;
the RGB sensor is further configured to sense compressed RGB information related to the sensed RGB light;
the IR sensor is further configured to sense compressed IR information related to the sensed reflected IR light; and
the controller is further configured to generate the 3D image using the compressed RGB information and the compressed IR information.

5. The 3D camera of claim 1, wherein:
the RGB sensor comprises:
  a single red (R) light sensor configured to sense R light;
  a single green (G) light sensor configured to sense G light; and
  a single blue (B) light sensor configured to sense B light;
the R light sensor, the G light sensor, and the B light sensor are each configured to sense compressed information related to the corresponding R light, G light, and B light of the RGB light;
the IR sensor further comprises a single sensor and is further configured to sense compressed IR information related to the IR light reflected from the reflective mirror; and
the controller is further configured to generate the 3D image using the compressed information corresponding to the R light, G light, and B light and the compressed IR information.

6. The 3D camera of claim 1, wherein the inner lens comprises:
a first inner lens configured to direct the incoming light directed to the third path to pass through the IR cut-off filter; and
a second inner lens configured to direct the incoming light directed to the third path to pass through the IR band pass filter.

7. The 3D camera of claim 1, wherein:
the RGB sensor comprises:
  a single red (R) light sensor configured to sense R light;
  a single green (G) light sensor configured to sense G light; and
  a single blue (B) light sensor configured to sense B light; and
the inner lens comprises an R lens, a G lens, and a B lens each configured to allow incoming light directed to the third path to pass through the IR cut-off filter and reach the corresponding R light sensor, G light sensor, and B light sensor; and
an IR lens configured to allow incoming light directed to the third path to pass through the IR band pass filter toward the IR sensor.

8. The 3D camera of claim 1, wherein:
the RGB sensor comprises:
  a single red (R) light sensor configured to sense R light;
  a single green (G) light sensor configured to sense G light; and
  a single blue (B) light sensor configured to sense B light; and
a surface of the inner lens is selectively blackened and configured to:
  allow incoming light directed to the third path to pass through the IR cut-off filter toward the corresponding R light sensor, G light sensor, and B light sensor, and
  allow incoming light directed to the third path to pass through the IR band pass filter toward the IR sensor.

9. The 3D camera of claim 8, wherein the light receiver further comprises barriers positioned between the R light sensor, the G light sensor, the B light sensor, and the IR sensor.

10. The 3D camera of claim 8, wherein the light receiver further comprises a plurality of micro-lenses each configured to direct the incoming light toward the corresponding R light sensor, G light sensor, B light sensor and toward the IR sensor after passing through the IR cut-off filter or the IR band pass filter.

11. The 3D camera of claim 8, wherein a surface of the inner lens comprises a plurality of recesses formed such that each of the plurality of recesses directs the incoming light directed to the third path to the corresponding R light sensor, G light sensor, B light sensor, and the IR sensor.

12. The 3D camera of claim 1, wherein:
the RGB sensor and the IR sensor each comprises more than 2 individual sensors and each of the RGB sensor and IR sensor comprises a smaller number of individual sensors that is smaller than a number of pixels of the reflective mirror;
the RGB sensor is further configured to sense compressed RGB information related to the RGB light;
the IR sensor is further configured to sense compressed IR information related to the IR light reflected from the reflective mirror; and
the controller is further configured to generate the 3D image using the compressed RGB information and the compressed IR information.

13. The 3D camera of claim 1, wherein:
the RGB sensor and the IR sensor each comprise a number of individual sensors that is smaller than a number of pixels of the reflective mirror;
the RGB sensor is further configured to sense compressed RGB information related to the RGB light;
the IR sensor is further configured to sense compressed IR information related to the IR light reflected from the reflective mirror; and
the controller is further configured to generate the 3D image by dividing the compressed RGB information and the compressed IR information into four equal quadrants corresponding to four equal quadrants of the corresponding RGB sensor and IR sensor.

14. A method for controlling a three-dimensional (3D) camera, the method comprising:
transmitting IR light with a predetermined pattern to at least one object;
directing incoming light via an outer lens, the incoming light comprising red-green-blue (RGB) light and IR light reflected from the object;
directing the incoming light to a first path and a second path via a reflective mirror, wherein the first path and the second path are both included in a third path toward an inner lens, and the incoming light is directed to pass through an IR cut-off filter on the first path and an IR band pass filter on the second path;
sensing the RGB light of the incoming light passing through the IR cut-off filter via an RGB sensor;
sensing the IR light reflected from the reflective mirror of the incoming light passing through the IR band pass filter via an IR sensor;

generating a 3D image using the sensed RGB light and IR light reflected from the reflective mirror,
wherein the IR cut-off filter blocks IR light of the incoming light from passing through and the IR band pass filter allows only IR light of the incoming light to pass through.

* * * * *